United States Patent
Klapp et al.

(10) Patent No.: US 10,685,458 B2
(45) Date of Patent: Jun. 16, 2020

(54) RADIOMETRIC IMAGING

(71) Applicants: The State of Israel, Ministry of Agriculture & Rural Development, Agricultural Research Organization (ARO) (VOLCANI CENTER), Rishon-LeZion (IL); RAMOT AT TEL AVIV UNIVERSITY LTD., Tel Aviv (IL)

(72) Inventors: Iftach Klapp, Modiin (IL); Nir Sochen, Tel-Aviv (IL); Shahar Papini, Herzliya (IL)

(73) Assignees: RAMOT AT TEL AVIV UNIVERSITY LTD., Tel Aviv (IL); The State of Israel, Ministry of Agriculture..., Rishon-LeZion (IL)

(*) Notice: Subject to any disclaimer, the term of this patent is extended or adjusted under 35 U.S.C. 154(b) by 0 days.

(21) Appl. No.: 16/318,897

(22) PCT Filed: Jul. 20, 2017

(86) PCT No.: PCT/IL2017/050824
§ 371 (c)(1),
(2) Date: Jan. 18, 2019

(87) PCT Pub. No.: WO2018/020494
PCT Pub. Date: Feb. 1, 2018

(65) Prior Publication Data
US 2019/0287268 A1    Sep. 19, 2019

Related U.S. Application Data

(60) Provisional application No. 62/364,335, filed on Jul. 20, 2016, provisional application No. 62/421,390, filed on Nov. 14, 2016.

(51) Int. Cl.
*G06T 7/80* (2017.01)
*G06T 7/254* (2017.01)
(Continued)

(52) U.S. Cl.
CPC ............ *G06T 7/80* (2017.01); *G06F 17/18* (2013.01); *G06T 5/50* (2013.01); *G06T 7/254* (2017.01);
(Continued)

(58) Field of Classification Search
None
See application file for complete search history.

(56) References Cited

U.S. PATENT DOCUMENTS

| | | | |
|---|---|---|---|
| 8,258,449 B1* | 9/2012 | Matthews | G01J 1/0492 250/203.1 |
| 2010/0155587 A1* | 6/2010 | Nikittin | H04N 5/33 250/252.1 |

(Continued)

*Primary Examiner* — James M Hannett
(74) *Attorney, Agent, or Firm* — Elmore Patent Law Group, P.C.; Joseph C. Zucchero; Carolyn S. Elmore

(57) ABSTRACT

A method for producing a calibrated radiometric image by un calibrated or partly calibrated thermal imaging device, the method comprising a steps of capturing first and second images on different sets of capturing conditions, obtaining motion matrix characterizing difference between said sets of capturing conditions, obtaining point spread function matrices characterizing a blur condition of said first and second images and obtaining system gain, and calculating a drift by inverting said system gain, motion and point spread function matrices; and calculating a calibrated image by inverting said system gain, motion, point spread function matrices and said first and second images.

20 Claims, 10 Drawing Sheets

(51) Int. Cl.
  *G06F 17/18* (2006.01)
  *G06T 5/50* (2006.01)
  *H04N 5/33* (2006.01)
  *H04N 5/365* (2011.01)

(52) U.S. Cl.
  CPC .............. *H04N 5/33* (2013.01); *H04N 5/3651* (2013.01); *H04N 5/3656* (2013.01); *G06T 2207/10048* (2013.01)

(56) References Cited

U.S. PATENT DOCUMENTS

2017/0374304 A1* 12/2017 Williams ............... H04N 5/365
2018/0276469 A1* 9/2018 Richards ................. G06T 7/33

* cited by examiner

RADIOMETRIC IMAGING

FIELD OF THE INVENTION

The present invention relates to imaging systems and particularly to infrared imaging devices methods and, more specifically to devices and methods for obtaining radiometric images by calibrating thermal images.

BACKGROUND OF THE INVENTION

Uncooled micro-bolometers based thermal focal plane array (UC-FPA) opening new opportunities for IR detection are disclosed in [1]. The US-FPA is characterized by small size, lower power consumption and a reduced price. As a result, the US-FPA-based cameras find use in many military and commercial applications as thermal imaging devices [2]. Portability of UC-FPA allows mounting the US-FPA-based cameras on micro unmanned air vehicle, which is very attractive for agricultural and environmental monitoring.

Radiometric mapping of crops is disclosed in [3]. Although the camera was mounted with a protective shield, FPA temperature was influenced by wind velocity and to some extent by change in radiation level related to clouds cover. Convection from a surface depends on fluid velocity [4]. Thus, changes in FPA temperature may be explained by variable wind velocity around the camera, where the envelope temperature affects the FPA temperature [2]. Surface temperature also depends on heat exchange by radiation balance with the environment [4]. The drift in the FPA temperature limits the possibility to gain a radiometric image from the thermal camera. Thus calibrating the camera response to stabilize the camera readout is an important challenge.

A typical micro-bolometer comprises two main parts: an absorber heated by thermal radiation and a thermometer the resistance of which changes with temperature. The micro-bolometer readout (r(x,y)) is in voltage or current values [1]. The obtained readout is translated into a gray level signal. Isolation of the micro-bolometer thermally allows thermal sensing without the burden of expensive cooling.

Thus, there a long-felt and unmet need to provide a US-FPA-based camera configured for obtaining radiometric images by calibrating thermal images.

SUMMARY OF THE INVENTION

It is hence one object of the invention to disclose a method of calibrating a gain value of a thermal imaging device comprising a focal plane array of a plurality of uncooled micro-bolometers. The aforesaid method comprises the steps of: (a) capturing a first image $y_1$ of an object of interest at a first set of capturing conditions by means of said thermal focal plane array; (b) altering said first set of capturing conditions into a second set of capturing conditions; (c) capturing a second image $y_2$ said object of interest at second second set of capturing conditions by means of said thermal focal plane array; (d) obtaining a motion matrix $[M(\Delta)]$ characterizing difference between said first and second sets of capturing conditions; (e) obtaining point spread function matrixes $[A_1]$ and $[A_2]$ characterizing a blur condition of said first and second images, respectively; (f) calculating a drift by inverse process relating to said motion and point spread function matrixes $[M(\square)],[A1],$gain $[G]$ and $[A2]$; and (g) calculating a calibrated image by inverting said motion point spread function matrixes $[M(\square)],[A1],[G]$ and $[A2]$ and said first and second images y1 and y2.

Another object of the invention is to disclose the step of altering said first set of capturing conditions into a second set of capturing conditions comprises an action selected from the group consisting of defocusing said thermal imaging device, spatially moving said thermal imaging device, introducing an aberration element into said thermal imaging device and any combination thereof.

The further object of the invention is to disclose the gain value which is space-invariant.

The further object of the invention is to disclose the method comprising a step of correcting gray level of the obtained images.

The further object of the invention is to disclose the steps of capturing said first and second images $y_1$ and $y_2$ at a spectral range selected from the group consisting of an ultraviolet spectral range, a visual spectral range, a near infrared spectral range, a middle infrared spectral range, a far spectral range and any combination thereof.

The further object of the invention is to disclose a self-calibrating thermal imaging device comprising: (a) thermal focal plane array further comprising a plurality of uncooled micro-bolometers; (b) an optical lens configured for creating an image at said thermal focal plane array; (c) an image processing unit configured for (i) obtaining a motion matrix $[M(\Delta)]$ characterizing difference between said first and second sets of capturing conditions; (ii) obtaining point spread function matrixes $[A_1]$ and $[A_2]$ characterizing a blur condition of said first and second images, respectively; (ii) obtaining camera gain $[G]$; (iv) calculating a drift by inverting said motion and point spread function matrixes $[M(\Delta)],[A_1],[G]$ and $[A_2]$; (iv) calculating a calibrated image by inverting said motion point spread function matrixes $[M(\Delta)],[A_1]$ and $[A_2]$ and said first and second images $y_1$ and $y_2$.

The abovementioned steps constitute a self-calibration process. The disclosed method can applied to more than two different images.

The further object of the invention is to disclose the device wherein at least of the following is true: (a) said optical lens is of a variable focus distance; (b) said device is spatially movable relative to an object to be imaged; (c) said device comprises an optical element configured for introducing an aberration into said thermal imaging device and any combination thereof. The further object of the invention is to disclose a method to producing a calibrated radiometric image from un calibrated or partly calibrated thermal imaging device. The aforesaid method comprising the steps of: (a) capturing a plurality of images $y_1 \ldots y_n$ of an object of interest by means of said thermal focal plane array with altering capturing conditions; (b) obtaining a motion matrix $[M(\Delta)]$ characterizing difference between said capturing conditions of each captured image; (c) obtaining point spread function matrixes $[A_1], , , [A_n]$ characterizing a blur condition of each captured images, respectively; (d) obtaining system gain $[G]$; (e) calculating a drift by inverting said system gain $[G]$, motion $[Mi(\Delta)]$ and point spread function matrixes, $[A_1] \ldots [A_n]$; (f) calculating a calibrated image by inverting said system gain $[G]$, motion $[M(\Delta)]$, point spread function matrixes $[A_1] \ldots [A_n]$ and said images $y_1 \ldots y_n$.

The further object of the invention is to disclose a self-calibrating thermal imaging device comprising: (a) thermal focal plane array further comprising a plurality of uncooled micro-bolometers; (b) an optical lens configured for creating an image at said thermal focal plane array; (c) an image processing unit configured for (i) capturing a plurality of images $y_1 \ldots y_n$ of an object of interest by means of said thermal focal plane array with altering capturing conditions; (ii) obtaining a motion matrix [Mi(Δ)] characterizing difference between said capturing conditions of each captured image; (iii) obtaining point spread function matrixes [A$_1$] , , , [A$_n$] characterizing a blur condition of each captured images, respectively; (iv) obtaining system gain [G]; (v) calculating a drift by inverting said system gain [G], motion [Mi(Δ)] and point spread function matrixes, [A$_1$] . . . [A$_n$]; (vi) calculating a calibrated image by inverting said system gain [G], motion [M(Δ)], point spread function matrixes [A$_1$] . . . [A$_n$] and said images y$_1$ . . . y$_n$.

One should note that obtaining of [Mi] matrices may be done following internal data coming from processes such image registration or from external data such as position sensors, or any combination.

In addition one should note that process upon need may be generalized from matrix algebra to operator calculus to support estimation processes which may include nonlinear steps.

A further object of the invention is to disclose a method of restoring radiometric images from thermal images captured at unstable conditions. The aforesaid method comprises the steps of: (a) capturing a plurality of N groups of thermal images; each group comprising at least two images; images within said groups are characterized by altered capturing conditions relative to each other; (b) assuming for each pair i of the images that x$_i$=sharpest $\{(y_{i0}, \ldots y_{iL})\}$; (c) assigning that the radiometric image $\{x\}=\{x\}^0$ and $\{y\}$; obtaining an updated value of gain G$^1$ and an updated value of drift d$^1$ by means of regression analysis; (d) assigning G=G$^1$, d=d$^1$ obtained at step c and $\{y\}$; fixing G; obtaining updated $\{x\}^1$ and d; (e) returning to step c with $\{x\}=\{x\}^1$ and $\{y\}$, obtaining an updated value of gain G$^2$ and an updated value of drift d$^2$ by means of regression analysis; (f) obtaining a plurality of N restored radiometric images by cycling steps c to d up to achieving convergence of cost function S(G,d,x) minimization.

A further object of the invention is to disclose the method comprising a step of altering capturing conditions of said first and second images further comprising an action selected from the group consisting of defocusing said thermal imaging device, spatially moving said thermal imaging device, introducing an aberration element into said thermal imaging device and any combination thereof.

A further object of the invention is to disclose the steps of capturing said first and second images y$_1$ and y$_2$ at a spectral range selected from the group consisting of an ultraviolet spectral range, a visual spectral range, a near infrared spectral range, a middle infrared spectral range, a far spectral range and any combination thereof.

A further object of the invention is to disclose the method a comprising a step of altering capturing conditions comprises altering systems transparency.

A further object of the invention is to disclose the step of minimizing S(G,d,x) implemented by means of Sparse Equations and Least Squares algorithm, with a small number of steps.

A further object of the invention is to disclose an imaging device comprising: (a) thermal focal plane array further comprising a plurality of light sensors; (b) an optical lens configured for creating an image at said thermal focal plane array; (c) an active optical lens configured to alter amplitude and/or phase within a field of view. (d) an image processing unit configured for: (i) capturing a plurality of N groups of thermal images; each group comprising at least two images; images within said groups are characterized by altered capturing conditions relative to each other; (ii) assuming for each pair i of the images that x$_i$=sharpest $\{(y_{i0},y_{iL})\}$; (iii) assigning that the radiometric image $\{x\}=\{x\}^0$ and $\{y\}$; obtaining an updated value of gain G$^1$ and an updated value of drift d$^1$ by means of regression analysis; (iv) Assigning G=G$^1$, d=d$^1$ obtained at step c and $\{y\}$; fixing G; obtaining updated $\{x\}^1$ and d; (v) returning to step c with $\{x\}=\{x\}^1$ and $\{y\}$, obtaining an updated value of gain G$^2$ and an updated value of drift d$^2$ by means of regression analysis; (vi) obtaining a plurality of N restored radiometric images by cycling steps iii to iv up to achieving convergence of cost function S(G,d,x) minimization.

further object of the invention is to disclose the image processing unit configured for minimizing S(G,d,x) by means of Sparse Equations and Least Squares algorithm, with a small number of steps.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

Figure 1:
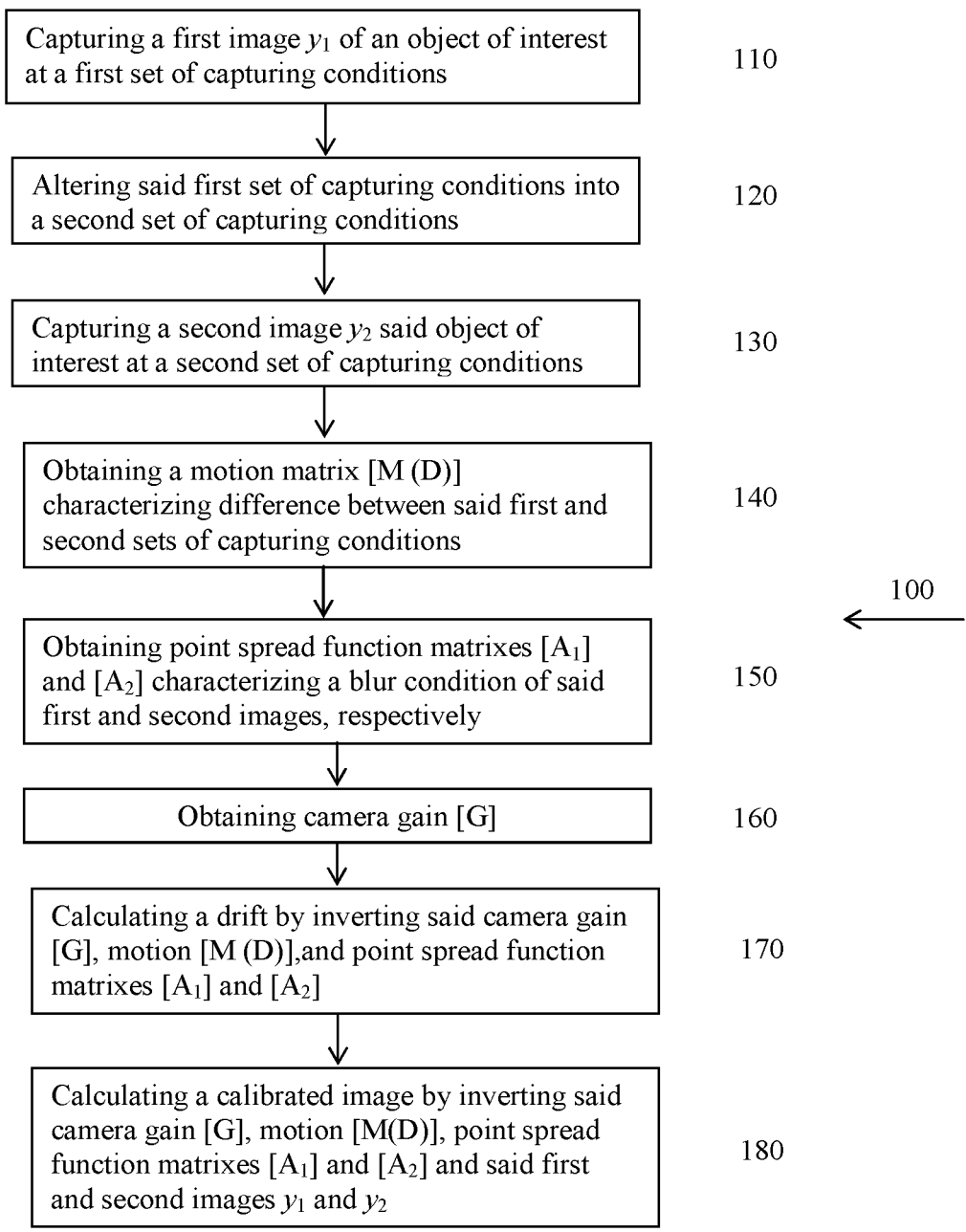
FIG. 1 is a flowchart of a method to producing a calibrated radiometric image from un calibrated or partly calibrated thermal imaging device.

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a device and a method for calibrating a radiometric value of a thermal imaging device.

In the UC-FPA, each micro-bolometer is responsible for a pixel of the image. Micro-bolometer response may be characterized as a function of Gain (G) and offset (d) such that:

$$r(x,y)=G(x,y)\cdot L(x,y)+d(x,y) \quad (1)$$

For simplicity we follow [5], assuming representative gain and offset for the FPA such that:

$$r(x,y)=G \cdot L(x,y)+D \tag{2}$$

Since isolation of the micro-bolometer is not perfect, the absolute value of the thermal image depends on the influence of the UC-FPA environment. Hence G=G(T) and d=d(T). G is usually a linear function of (T) while (d) may be a high order polynomic function of T or even involve derivatives in (T) [5], $$r(x,y)=G(T) \cdot L(x,y)+d(T) \tag{3}$$

In previous work it was suggested and demonstrated that if FPA temperature changes with environment temperature, one may assume that G and (d) are linear functions of the FPA temperature [5]. Another work showed that under some conditions, if a camera contains a mechanical shutter, the shutter can be used as a black body (BB) for correcting the influence of temperature drift on readout value [6]. In a detailed model which distinguishes between the temperature of the envelope and the FPA, the offset function is a polynomic function of the two temperatures. This function is affected by three main factors:
the influence of the radiation of the envelope on the pixel;
the radiation of the pixel out of the FPA; and
the offset value in the nominal temperature [2].

The calibration of each of the gain and the offset functions is done using a BB [2,5-7]. While the gain calibration is relatively simple as it is a linear function of the FPA temperature, the offset calibration is tedious and difficult.

According to the present invention, the drift value can be estimated from two successive images taken at two different blur levels. In this case there is no need of calibration for temperature variation.

Assuming two images taken by a UC-FPA system, with two different point-spread-functions, the image formation is:

$$y_1=[G_1] \cdot ([A_1]x)+d_1(T)+n_1, [G_1]=[G_1(T,i)] \tag{4}$$

$$y_2=[G_2] \cdot ([A_2]x)+d_2(T)+n_2, [G_2]=[G_2(T,i)] \tag{5}$$

Where $A_1, A_2$ are the point spread function (PSF) matrices, x is the object radiation and $y_1, y_2$ are the readouts in two different blur conditions. $n_1$ and $n_2$ are the detection noise. A,x,y are given in a lexicographic form. Since the camera integration time is much faster than changes in thermal loads, if $y_1$ and $y_2$ are taken one after the other then $D=D_1=D_2$ and $[G]=[G_1]=[G_2]$ assuming no electronic cross talk the gain is a diagonal matrix where G(i,i) is the gain of the (i) pixel.

In the general case of space variant gain, G(i,i) is changing with (i), Thus the system becomes:

$$y_1=[G] \cdot ([A_1]x)+d(T)+n_1 \tag{6}$$

If images taken from moving platform D=motion{D1}=D2 and [G]=motion{[G1]}=[G2], the motion { } causes that x(i,j) is subjected to different Gain and Drift. Assuming that equal geometries can be recognized one can estimate the motion and relate Gain and Drift in both images. To support this case lets denoted [M] as the motion matrix and Δ is a generalized motion between frames, x is the common field of view.

$$y_2=[M(\Delta)][G] \cdot ([A_2]x)+[M(\Delta)]d(T)+n_1 \tag{7}$$

Using Eq. 7 One can express x by $y_2$ $$x=\text{inv}\{[M(\Delta)][G] \cdot [A_2]\} \cdot (y_2-[M(\Delta)]d(T)) \tag{8}$$

The inv{ } denoted a generalized inverse function. Assign Eq. 8 in Eq. 6

$$\text{inv}\{[G]\}(y_1-d(T))=[A_1]\text{inv}\{[M(\Delta)][G][A_2]\}(y_2-[M(\Delta)]d(T)) \tag{9}$$

Please note that the noise is inseparable from the measurement, and thus $y_1$ and $y_2$ include the additive noise.

$$y_1-d(T)=[G][A_1]\text{inv}\{[M(\Delta)][G][A_2]\}(y_2-[M(\Delta)]d(T)) \tag{10}$$

Reorder Eq. 10:

$$[G][A_1]\text{inv}\{[M(\Delta)][G][A_2]\}[M(\Delta)]d(T)-d(T)=[G][A_1]\text{inv}\{[M(\Delta)][G][A_2]\}y_2-y_1 \tag{11}$$

Finally, we can get an estimator to d by:

$$\tilde{d}(T)=\text{inv}\{[G][A_1]\text{inv}\{[M(\Delta)][G][A_2]\}-[I]\}[G][A_1]\text{inv}\{[M(\Delta)][G][A_2]\}y_2-y_1) \tag{12}$$

[I] is the identity matrix. Generally speaking, (d) and [G] may be associate with different temperature or different temperature distribution. In this work we assume that G is well calibrated and known thus its dependency in temperature associated with D is not required and Δ=0. In a special case, when the gain [G] is equal to all pixels (space invariant gain), the gain matrix may represent as:

$$[G]=C \cdot [I] \tag{13}$$

C is a constant, we get that:

$$\tilde{d}(T)=\text{inv}\{[C \cdot [I]][A_1]\text{inv}\{[C \cdot [I]][A_2]\}-[I]\}([C \cdot [I]][A_1]\text{inv}\{[C \cdot [I]][A_2]\}y_2-y_1) \tag{14}$$

Elaborate Eq.: (14)

$$\tilde{d}(T)=\text{inv}\{[(C/C) \cdot [I]][A_1]\text{inv}\{[[I]][A_2]\}-[I]\}([C/C) \cdot [I]][A_1]\text{inv}\{[[I]][A_2]\}y_2-y_1) \tag{15}$$

Since gain is positive number, C>0 we get that:

$$\tilde{d}(T)=\text{inv}\{[A_1]\text{inv}\{[A_2]\}-[I]\}([A_1]\text{inv}\{[A_2]\}y_2-y_1) \tag{16}$$

Finally, we can use Eq. 8 to estimate the real radiometric value of the object, such that $$\tilde{x}=\text{inv}\{[G_2][A_2]\} \cdot (y_2-\tilde{d}(T)) \tag{17}$$

We assumed two images where taken one after another. The first image ($I_1$) is in focus subjected to blurring of diffraction limited system with PSF matrix [$A_1$]. The second image ($I_2$) was taken with a system subjected to a defocus with a wave front error of 1 wavelength with a PSF matrix [$A_2$]. A quasi-monochromatic space invariant model assumed, where wavelength equals to 10 micron. Camera readout of the two images in the two blur conditions was realized according to Eq. 6 and 7.

Reference is now made to FIG. 1, presenting a method 100 of calibrating a gain value of a thermal imaging device comprising a focal plane array of a plurality of uncooled micro-bolometers. According to the aforesaid method, a first image $y_1$ of an object of interest is captured at a first set of capturing conditions by means of said thermal focal plane array at step 110. Then, the first set of capturing conditions is altered into a second set of capturing conditions (step 120). A second image $y_2$ said object of interest is captured at the second set of capturing conditions at step 130. A motion matrix [M(Δ)] characterizing difference between said first and second sets of capturing conditions is obtained at step 140. Then, point spread function matrixes [$A_1$] and [$A_2$] characterizing a blur condition of said first and second images are obtained at step 150. After that system gain [G] is obtained (step 160). At step 170 a drift is calculated by inverting said system gain [G], motion [M(Δ)], and point spread function matrixes [$A_1$] and [$A_2$]. The similar operation is applied to the system gain [G], motion[M(Δ)], point spread function matrixes [$A_1$] and [$A_2$] and said first and second images $y_1$ and $y_2$ to obtain a calibrated image at step 180.

It should be emphasized that steps 170 and 180 can be performed both concurrently and consecutively. In other words, steps 170 and 180 can be considered as a single operation.

In accordance with the present invention a self-calibrating thermal imaging device comprises: (a) thermal focal plane array further comprising a plurality of uncooled microbolometers; (b) an optical lens configured for creating an image at said thermal focal plane array; (c) an image processing unit configured for (i) obtaining a motion matrix $[M(\Delta)]$ characterizing difference between said first and second sets of capturing conditions; (ii) obtaining point spread function matrixes $[A_1]$ and $[A_2]$ characterizing a blur condition of said first and second images, respectively; (iii) obtaining system gain $[G]$; (iv) calculating a drift by inverting said system gain $[G]$, motion $[M(\Delta)]$, and point spread function matrixes $[A_1]$ and $[A_2]$; (iv) calculating a calibrated image by inverting said system gain $[G]$, motion $[M(\Delta)]$, point spread function matrixes, $[A_1]$ and $[A_2]$ and said first and second images $y_1$ and $y_2$.

The capturing conditions can be altered by the following ways:

defocusing said thermal imaging device by changing a focus distance of the lens;

displacing the thermal imaging device, introducing an aberration element (for example, an optical wedge) into said thermal imaging device.

It should be mentioned that using more than two images for the disclosed calibration procedure is also in the scope of the present invention.

To simulate a realistic system we assumed camera specifications similar to these of Flir TAU2 [8], pixel size is 17 micron, focal length=9 mm, $F_{number}$=0.9.

The signal to noise ratio was 1000. Irradiance value of each pixel (signal denoted (x)) was simulated by uniformly distributed random number with a range between 0 and 100. We assumed that the camera was nominally calibrated in $T_0$=25° C. and that the measurement took place at 32° C. The drift value in the calibration point $d(T_0)$ was simulated as a uniform random process with a range between 0 and 5. We assume that drift change is a parabolic function of temperature change $dT=T-T_0$ so that:

$$d(T)=d(T_0)\cdot dT^2 \qquad (18)$$

In the first case of a space variant gain and a linear dependence in temperature the gain matrix is of the form:

$$G(T)=[diag(g)]\cdot G(T_0)\cdot dT/T_0 \qquad (19)$$

The diagonal g(i) is a function of the location which is a lexicographic order of the two dimensional spatial gain function. In a specific example we assume a parabolic dependence of the slope in pixel coordinate, we assume that the average value of g equal 1, such that in addition the gain dependency in temperature in $T_0$ equals 6:

$$g(m,n)=g\cdot(m^2+n^2)+\text{const}, \langle g \rangle =(1/N)\cdot\Sigma\Sigma g(m,n))=1, G(T_0)=6 \qquad (20)$$

Figure 2:
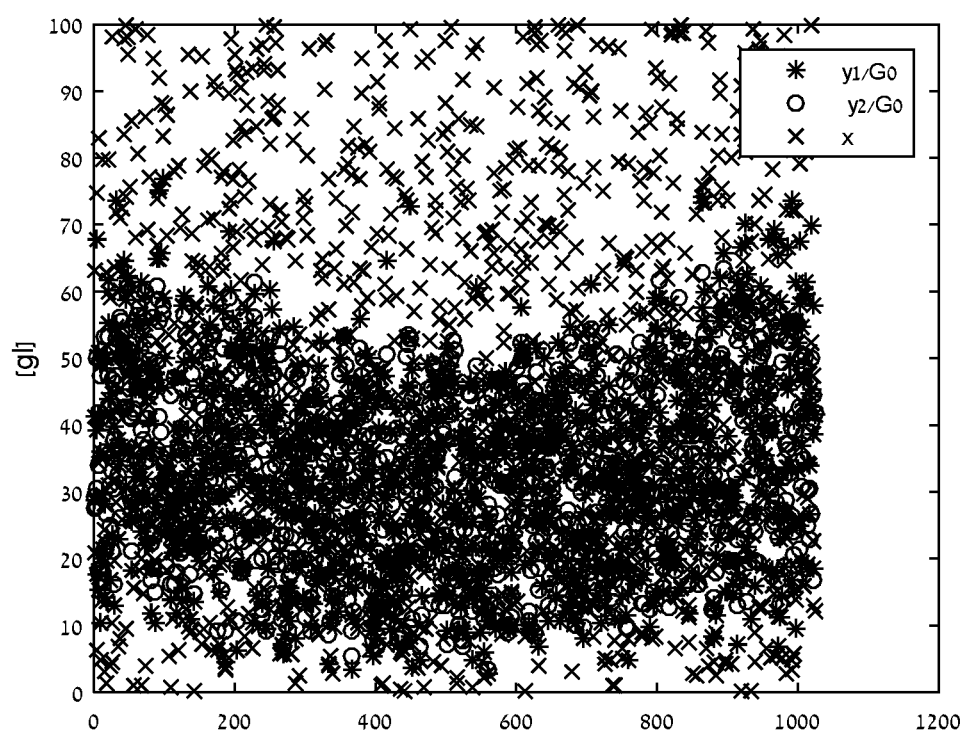
FIG. 2 illustrates comparison of thermal measurements and the radiometric value of the object in case of space variant gain.

In FIG. 2, we show the resulted thermal measurement $y_1, y_2$ and the ground through radiometric object x. To place the measurements on the same scale as the object the measurements where normalized by $G_0=G(T_0)$. Observing the image one see that the thermal images are far from the radiometric value of the object.

Following the proposed model, the first step is to estimate the drift from measurements, this operation evolve an inverse process. Since the image is subjected to noise in case where the PSF matrix is characterized by ill conditioned matrix, we use regularization to prevent noise amplification. The condition number of $[A_1]$ in very low thus no regularization was required. The inverse operation of $[A_2]$ was realized by Tikhonov regulator [9] with $\alpha_2$=0.0001 for inv{A2} respectively:

$$\text{inv}\{[G][A_i]\}=(([G][A_i])^T([G][A_i])+\alpha_i[I])^{-1}([G][A_i])^T \qquad (21)$$

Using Eq. (12) we estimated the drift:

$$\tilde{d}(T)=\text{inv}\{[G][A_1]\text{inv}\{[G][A_2]\}-[I]\}([G][A_1]\text{inv}\{[G][A_2]\}y_2-y_1) \qquad (22)$$

Figure 3:
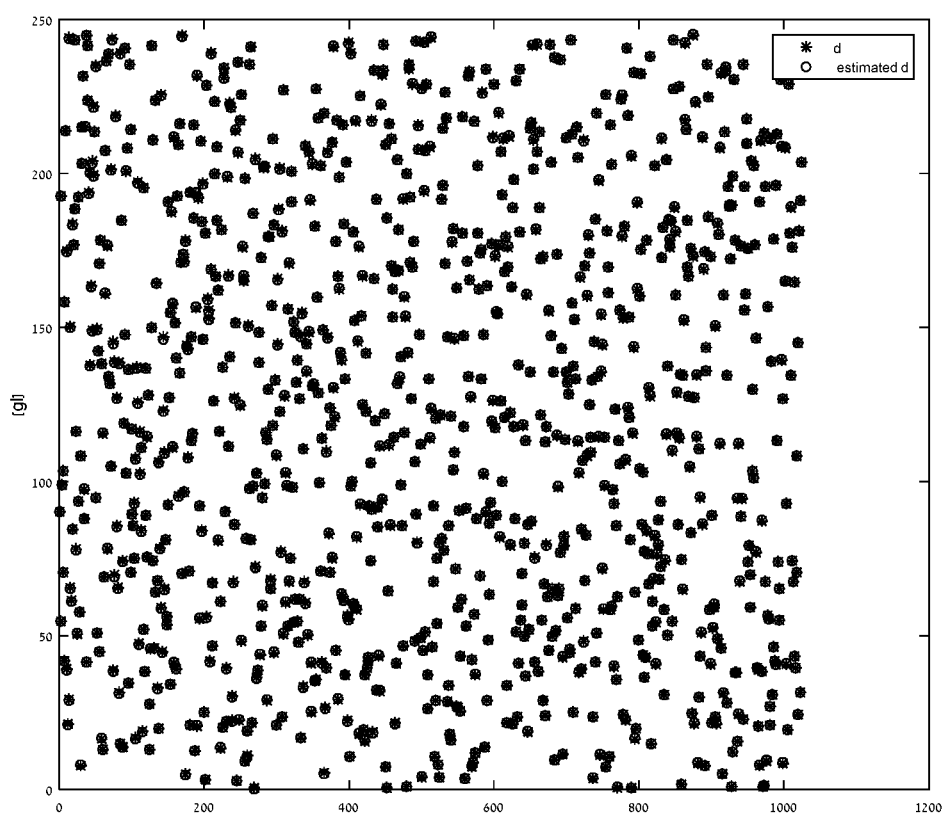
FIG. 3 is a graph comparing estimated and real drift values in the case of space variant gain.

In FIG. 3, the estimated drift Vs the real generated drift value is presented. The average gray level error of the presented realization is 0.1061%.

Next, following the proposed model, we use the estimated drift to calculate estimation for the radiometric value of the object.

$$\tilde{x}=\text{inv}\{[G_1][A_1]\}\cdot(y_1-\tilde{d}(T)) \qquad (23)$$

Figure 4:
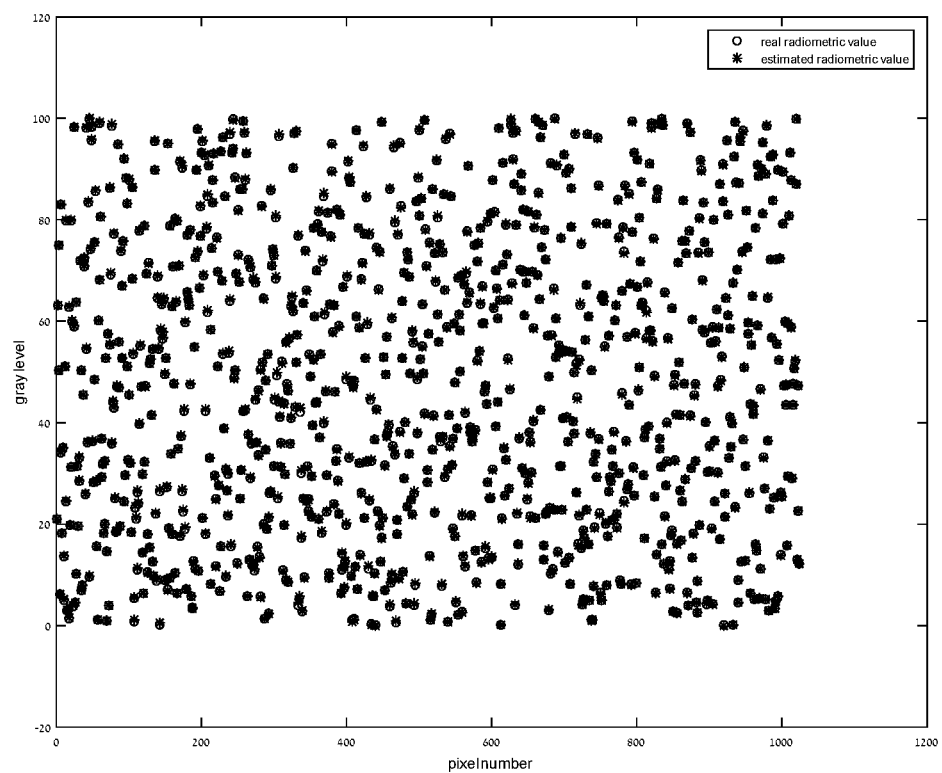
FIG. 4 is a graph comparing estimated and real radiometric values of an object.

A graphical comparison between the value of x and the estimator $\tilde{x}$ is presented in FIG. 4.

Observing FIG. 4, we see that the estimator is following the real value accurately, where the average error is 1.0636%.

The disclosed specific inversing procedure is provided in an unlimited manner. Other estimation procedures are also in the scope of the present invention. The disclosed method is also applicable in other spectral ranges such that UV, visible and near-, middle- and far-infrared ranges.

Following the above model assuming the case of the space invariant gain, the spatial dependence is constant, we assume it equals to the average value of the above space invariant case, and equal to <g>. The resulted gain matrix is $$G(T)=\langle g \rangle \cdot G(T_0)\cdot[I]\cdot dT/T_0 \qquad (24)$$

Figure 5:
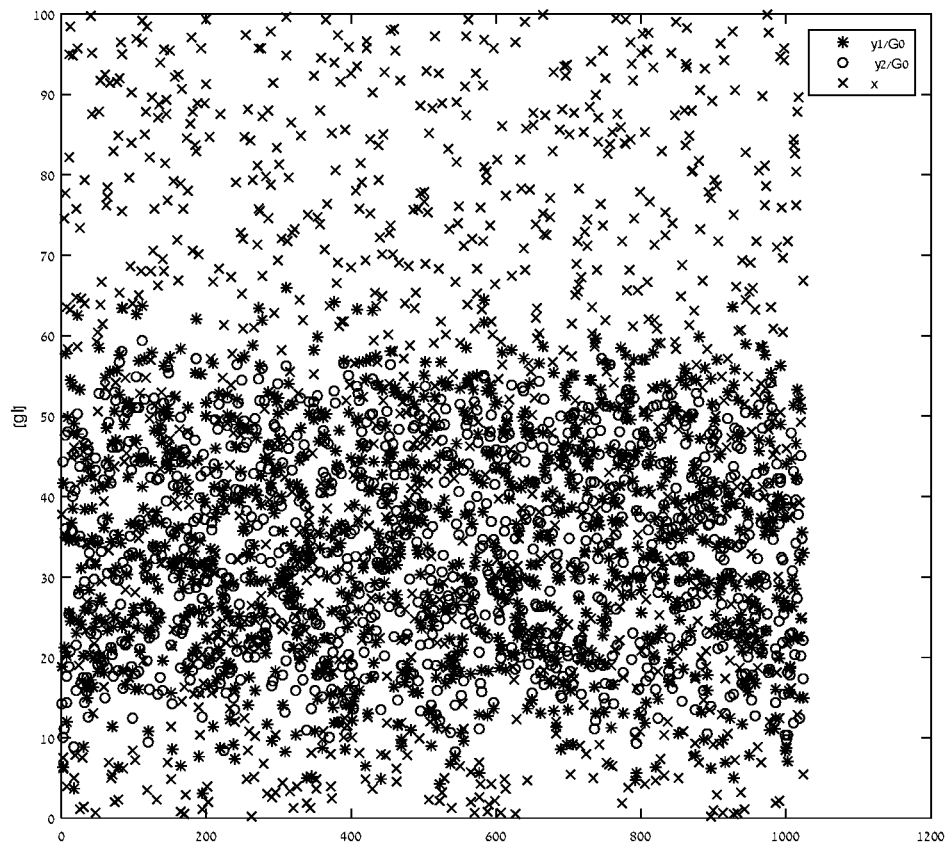
FIG. 5 is a graph comparing thermal measurements of the device and the radiometric value of the object in case of space invariant gain.

As before in FIG. 5, we show the resulted thermal measurement y1,y2 and the ground through radiometric object x. The thermal images where normalized by G0=G($T_0$). Observing the image once, again one sees that the thermal images are far from the radiometric value of the object.

Following the proposed method we use the measurement to estimate the drift by equation (16). We would like to emphasize that as we show above, in the special case of space invariant gain, knowledge on the gain function is not required. Here again while the inverse operation for matrix [A1] done in naïve fashion, inversion of matrix [A2] realized by regularization as in Eq. 21 with $\alpha 2$=0.00001.

Figure 6:
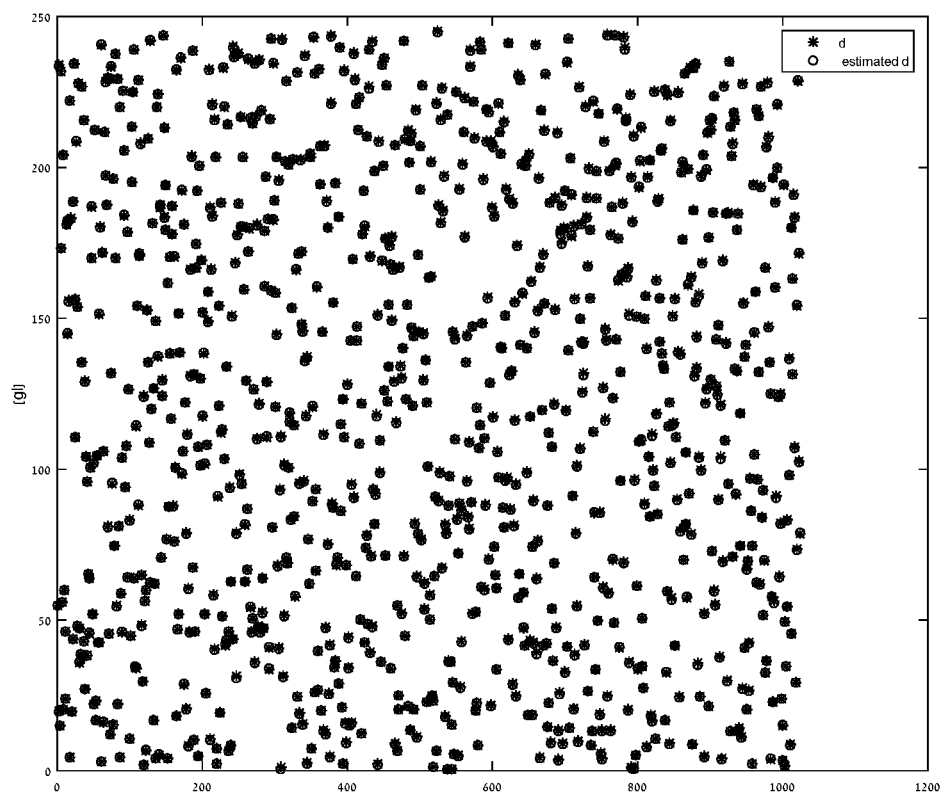
FIG. 6 is a graph comparing estimated and real drift value in the case of space invariant gain case.

In FIG. 6 we present the estimated drift Vs the real generated drift value. The average gray level error of the presented realization is 0.5857%.

In many cameras one can measure the change in FPA temperature (dT) directly. However, for the sake of the completeness we show how to estimate dT from the model. We used Eq. 18 using the average dT value as our estimator.

$$\langle dT \rangle =\sqrt{\text{mean}(\tilde{d}(T)/d(T_0))} \qquad (25)$$

Assigning <dT> in Eq. 24 we get an estimation for G(T). Normalizing the readout we get:

$$y_{1e}=(y_1-\tilde{d}(T))/G(T) \qquad (26)$$

The restored estimator to the object radiation is $$x_e=\text{inv}\{[A_i]\}\cdot y_{1e} \qquad (27)$$

Figure 7:
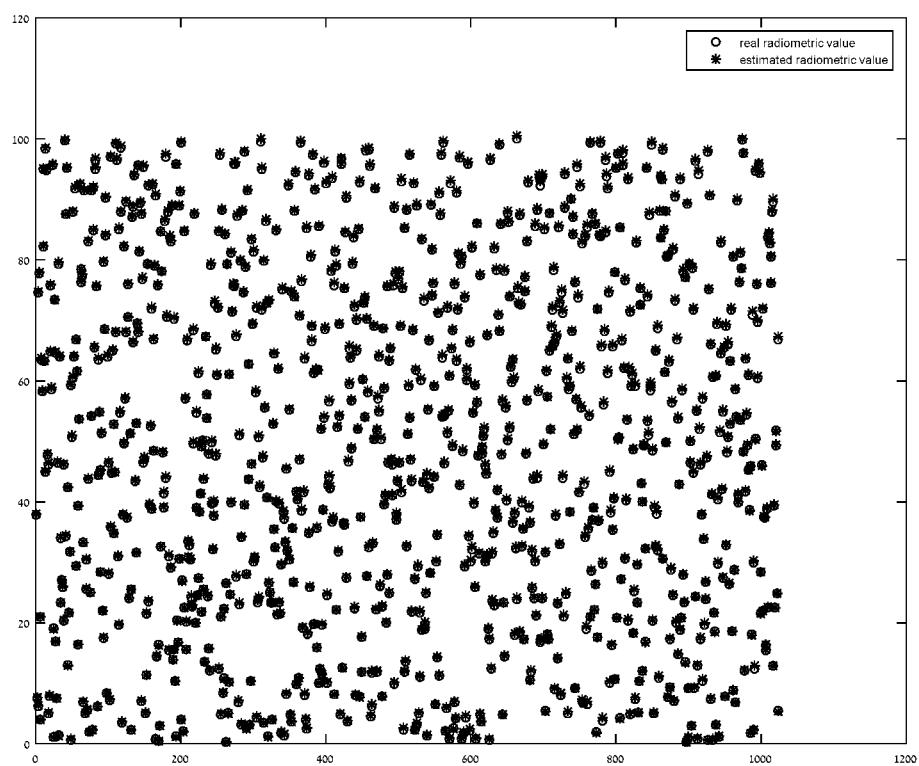
FIG. 7 is a graph comparing real and estimated radiometric value.

A graphical comparison between the value of x and the estimator $x_e$ is presented in FIG. 7. We see that the estimator is following the real value accurately, where the average error is 0.99%.

Two images with different point spread functions (PSF) are successively captured. Since the camera integration time is much faster than changes in thermal loads, we can assume gain G and drift d are constant, the images $y_1$ and $y_2$ can be described by:

$$y_1 = [G] \cdot ([A_1]x(i)) + d(T) + n_1, \quad (28)$$

$$y_2 = [G] \cdot ([A_2]x(i)) + d(T) + n_2, \quad (29)$$

$$[G] = [G(T,i)], \quad (30)$$

where x is the object radiation, $A_1$ and $A_2$ are the 2D convolution with the PSF of the lens which translates to matrix multiplication in the column-stack representation (Image formation may also be space variant), G is the gain of the system, d is the drift offset values vector, n is the detection noise and $y_1$ and $y_2$ are the readout.

All the images can be described by vectors in $R^M$ in column-stack notation, where M is the number of pixels. images denoted by lowercase letters.

In the general case, gain G and drift d depend on the location of the FPA are unknown. G, drift d and radiometric image x can be estimated by means of iterative optimization of the multi-variable likelihood function.

The joint estimation required solving minimization problem, the proposed cost function is least squares L2 norm with linear steps, however the algorithm is generally not limited to specific cost function and may include prior knowledge, nonlinear terms or other norms or shifts between images such as presented in U.S. provisional patent application 62/364,335.

Thus in first embodiment the cost function is:

$$S(G,d,x) = \Sigma_i \Sigma_j \| y_{i,j} - [G(T)] \cdot ([A_j]x_i) - d(T) \|_2^2 \quad (1)$$

The image number is (i,j).

In a first embodiment, for the sake of minimization accuracy, N pairs (i) of two images (L=2) with different blur j=0,1 ($y_{i0}, y_{i1}$) are taken sequentially such that gain G and drift d are the same. Each pair observed different field of view x engages additional information (thus we use on-site calibration 11). In the simulation example below N=9 pairs. One should note that additional information may be gained by changing PSF matrix $A_j$, adding more images in different blur and changing the total number of images (L) taken for each object (i). The method may work with other optical change such as realized with a semi-transparent aperture 10.

The proposed algorithm is based on minimization of cost function S(G,d,x).

To minimize S(G,d,x), we use the following:

When fixing g, S(G,d,x) is the L2 norm of an affine function of x and d.

When fixing x, S(G,d,x) is the L2 norm of an affine function of g and d. Here, the equations on each pixel are also independent.

Figure 8:
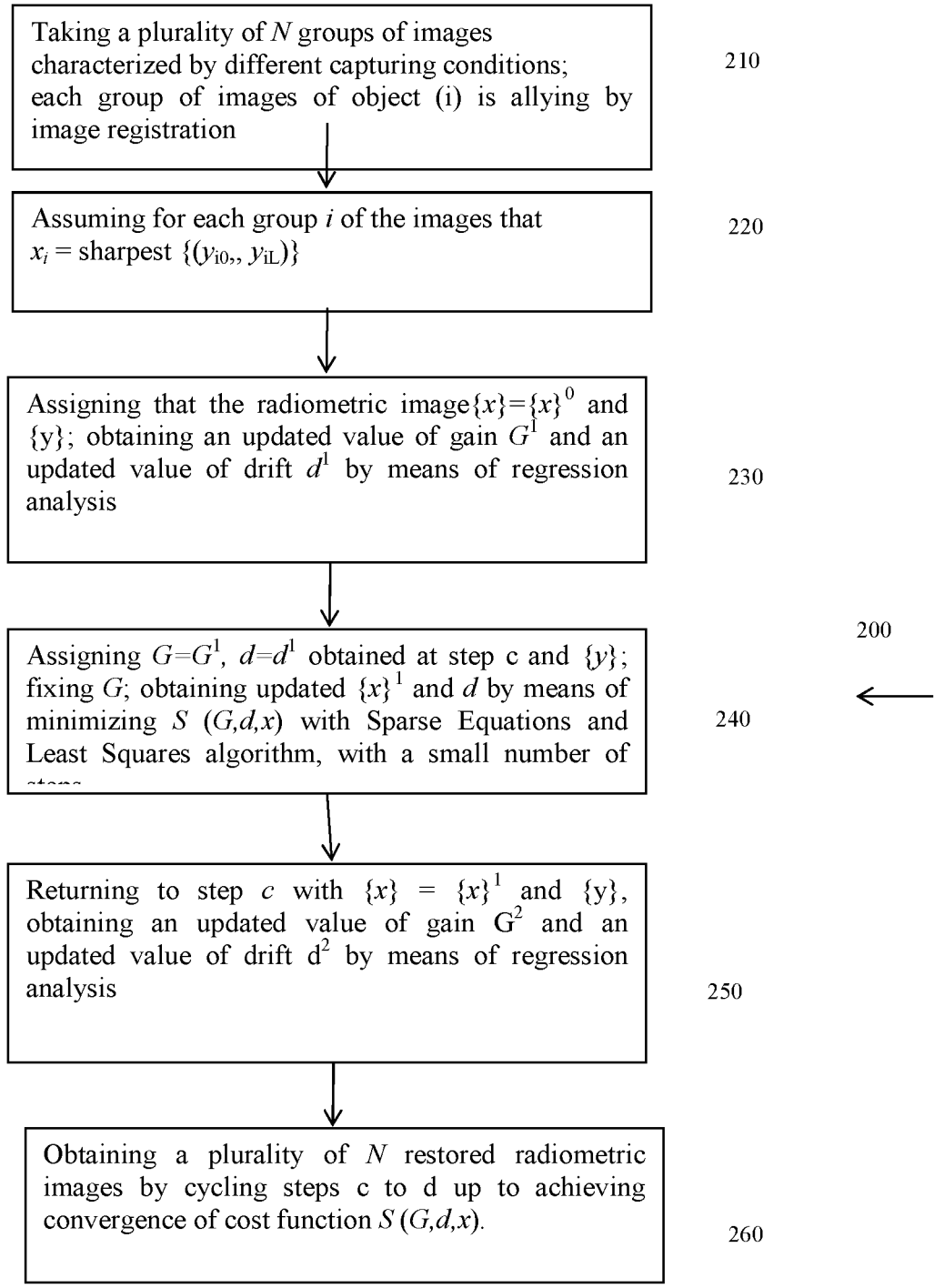
FIG. 8 is a flowchart of a method for restoring radiometric images from thermal images.

Reference is now made FIG. 8 presenting method 200 of restoring radiometric images from thermal images. N pairs of images are captured at step 210. The images of each pair are characterized by altered capturing conditions relative to each other. To initiate the algorithm we assume $x_i$=sharpest{($y_{i0}, y_{iL}$)} (sharpest image of object $x_i$) (step 220). Then gain G and drift d values pertaining to individual pixels are found by regression analysis of the equations associated therewith.

Thus, we minimize S(G,d,x) with iterations of two steps: "xd" step: G is fixed. To minimize S(G,d,x), the Sparse Equations and Least Squares algorithm 12], is used for a small number of steps. Thus, we update x and d (step 230).

"gd" step: x is fixed. Since we have a decoupled system of least square problems, we explicitly find the minimum g and d using linear regression, and update them (step 240).

The aforesaid two steps are cycled (step 250) up to achieving convergence of cost function S(G,d,x) minimization (step 260).

Detailed description of the abovementioned algorithm is below, one should acknowledge that pair of images may be generalized to group of images.

Let: $S(G,d,x) = \Sigma_i \Sigma_j \| y_{i,j} - [G(T)] \cdot ([A_j]x_i) - d(T) \|_2^2$ Summation over the pixels is realized by the norm
G?,d?,{x}?
Pairs: i={0,N−1}
Blur: j={0,L}@L=1
Let measured set of images {y}={($y_{1,0}, y_{1,1}$)($y_{2,0}, y_{2,1}$) ... ($y_{N,0}, y_{N,1}$)} of set of N objects {x}
Each group of images of object (i) is allying by image registration.
Initial conditions for G and d by regression (Each pixel (1) have N*L equations)
Assign for each object of $\{x\}^0$: $x_i^0$=sharpest $\{y_{i,0}, y_{i,1}\}$
Step1("gd"):
Assign: $\{x\} = \{x\}^0$
solve Regression for each pixel (1<<M):

$$\arg \min \sum_i \sum_j (x_l ij * G_l + y_l ij + d_l)^2 \Rightarrow G^1, d^1$$

Step2("xd"):
Initial conditions: $d = d^1$
Assign: $G = G^1$, {y}
For Q iterations by LSQR or other minimization method:
  $\arg\min\{S(G=G^1, d, \{x\})\} \Rightarrow d^2, \{x\}^1$
Return to Step1 till convergence of S( ) minimization
Each group of images of object (i) is allying by image registration.

Figure 9A:
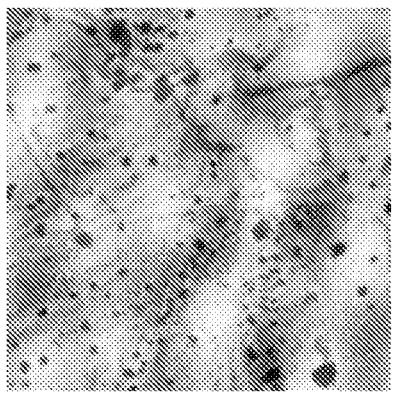
FIGS. 9a to 9d are exemplary images before and after image processing according to the present invention; and the ground true image to compare with the abovementioned images.
Figure 9B:
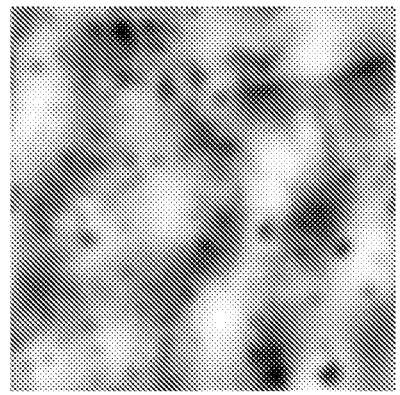
Figure 9C:
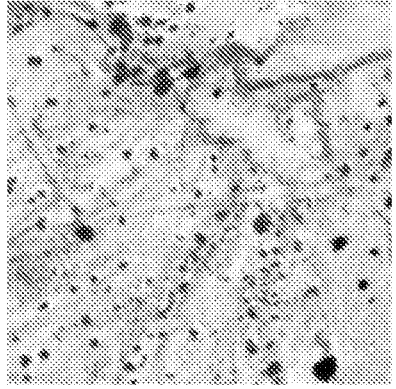
Figure 9D:
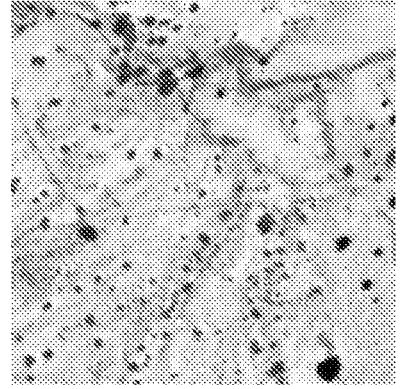

The simulation used few 256×256 thermal images taken consecutively by FLIR-sc655 from air. For each view, two samples were taken. The first image (FIG. 9a) constitutes an original sharp image. The second image (FIG. 9b) mimics capturing by blurred optics by convolution with blurring kernel. All images were subjected to the same unknown gain and drift and additive normal noise such that signal to noise ratio was 3500. Observing the image, one can see that the gain and drift causes severe gray level variations. The restored radiometric image x and the "ground truth" original image x1 are shown in FIGS. 9c and 29, respectively. The resulted ratio between the standard deviation (std) of the restoration error to that of the original signal is |std(x−x1)|/|std(x1)|=0.00145.

Figure 10:
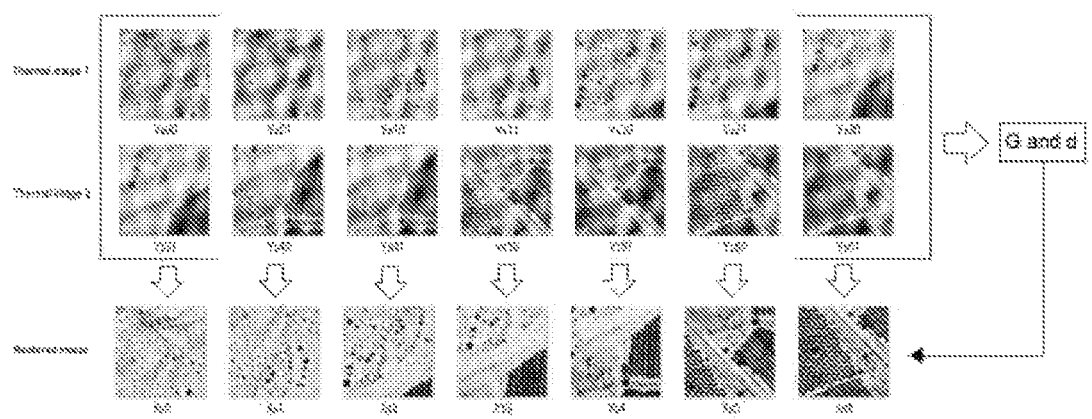
FIG. 10 is graphical presentation of a method for restoring radiometric images from thermal images.

Reference is now made to FIG. 10 illustrating the procedure of restoring radiometric images from thermal images. Restoration accuracy depends upon number of pairs of images. In the presented example, number of image pairs is 7. Jointly obtained gain G and drift d were used for estimation of the radiometric images in all pairs of images.

REFERENCES

1. R. K. Bhan, R. S. Saxena, C. R. Jalwania, and S. K. Lomash, "Uncooled Infrared Microbolometer Arrays and their Characterisation Techniques," Defence Science Journal, 59, 6, 580-589, (2009).

2. A. Tempelhahn, H. Budzier, V. Krause, and G. Gerlach, "Shutter-less calibration of uncooled infrared cameras," J. Sens. Sens. Syst., 5, 9-16, (2016).
3. K. Kusnierek, A. Korsaeth, "Challenges in using an analog uncooled microbolometer thermal camera to measure crop temperature," Int J Agric & Biol Eng. 7, 4 60-74 (2014).
4. Holman, "Heat transfer", McGraw-Hill (1989).
5. P. W. Nugent, J. A. Shaw, "Calibration of uncooled LWIR microbolometer imagers to enable long-term field deployment," Proc. of SPIE Vol. 9071 90710V, 1-10 (2014).
6. P. W. Nugent, J. A. Shaw, N. J. Pust, "Radiometric calibration of infrared imagers using an internal shutter as an equivalent external blackbody," Opt. Eng. 53, 12, 123106 (2014).
7. P. W. Nugent, J. A. Shaw, N. J. Pust, "Correcting for focal-plane-array temperature dependence in microbolometer infrared cameras lacking thermal stabilization," Opt. Eng. 52, 6, 061304 (2013).
8. http://www.flir.com/cores/display/?id=54717
9. P-C, Hensen, J. G. Nagy and P. O'leary, "Debluring images matrices, spectra and filter," SIAM (2006).
10. R. Olbrycht, B. Wiecek and G. De Mey, "Thermal drift compensation method for microbolometer thermal cameras" Applied Optics Vol. 51, Issue 11, pp. 1788-1794 (2012).
11. B. M. Ratliff, Majeed M. Hayat. and Russell C. Hardie, "An algebraic algorithm for nonuniformity correction in focal-plane arrays" Vol. 19, No. 9/September 2002/J. Opt. Soc. Am. A
12. LSQR: Sparse Equations and Least Squares http://web.stanford.edu/group/SOL/software/lsqr/

The invention claimed is:

1. A method to producing a calibrated radiometric image from uncalibrated or partly calibrated thermal imaging device, said method comprising a focal plane array of a plurality of uncooled micro-bolometers; said method comprising the steps of:
 a. capturing a first image $y_1$ of an object of interest at a first set of capturing conditions by means of said thermal focal plane array;
 b. altering said first set of capturing conditions into a second set of capturing conditions;
 c. capturing a second image $y_2$ said object of interest at the second set of capturing conditions by means of said thermal focal plane array;
 d. obtaining a motion matrix $[M(\Delta)]$ characterizing difference between said first and second sets of capturing conditions;
 e. obtaining point spread function matrixes $[A_1]$ and $[A_2]$ characterizing a blur condition of said first and second images, respectively;
 f obtaining system gain $[G]$;
 g. calculating a drift by inverting said system gain $[G]$, motion $[M(\Delta)]$ and point spread function matrixes $[A_1]$ and $[A_2]$;
 h. calculating a calibrated image by inverting said system gain $[G]$, motion $[M(\Delta)]$, point spread function matrixes $[A_1]$ and $[A_2]$ and said first and second images $y_1$ and $y_2$.

2. The method according to claim 1, wherein said step of altering said first set of capturing conditions into a second set of capturing conditions comprising an action selected from the group consisting of defocusing said thermal imaging device, spatially moving said thermal imaging device, introducing an aberration element into said thermal imaging device and any combination thereof.

3. The method according to claim 1, wherein said gain value is space-invariant.

4. The method according to claim 1 comprising a step of correcting gray level of said first and second images.

5. The method according to claim 1, wherein steps of capturing said first and second images $y_1$ and $y_2$ at a spectral range selected from the group consisting of an ultraviolet spectral range, a visual spectral range, a near infrared spectral range, a middle infrared spectral range, a far spectral range and any combination thereof.

6. A self-calibrating thermal imaging device comprising:
 a. thermal focal plane array further comprising a plurality of uncooled micro-bolometers;
 b. an optical lens configured for creating an image at said thermal focal plane array;
 c. an image processing unit configured for
  i. obtaining a motion matrix $[M(\Delta)]$ characterizing difference between said first and second sets of capturing conditions;
  ii. obtaining point spread function matrixes $[A_1]$ and $[A_2]$ characterizing a blur condition of said first and second images, respectively;
  iii. obtaining a camera gain $[G]$;
  iv. calculating a drift by inverting said camera gain $[G]$, motion $[M(\Delta)]$, and point spread function matrixes, $[A_1]$ and $[A_2]$;
  v. calculating a calibrated image by inverting said camera gain $[G]$, motion $[M(\Delta)]$, point spread function matrixes $[A_1]$ and $[A_2]$ and said first and second images $y_1$ and $y_2$.

7. The device according to claim 6, wherein at least of the following is true:
 a. said optical lens is of a variable focus distance;
 b. said device is spatially movable relative to an object to be imaged;
 c. said device comprises an optical element configured for introducing an aberration into said thermal imaging device and any combination thereof.

8. The device according to claim 6, wherein said gain value is space-invariant.

9. The device according to claim 6, wherein said image processing unit is configured for correcting gray level of said first and second images.

10. The device according to claim 6, wherein said optical lens is configured for capturing said first and second images $y_1$ and $y_2$ at a spectral range selected from the group consisting of an ultraviolet spectral range, a visual spectral range, a near infrared spectral range, a middle infrared spectral range, a far spectral range and any combination thereof.

11. A method to producing a calibrated radiometric image from uncalibrated or partly calibrated thermal imaging device, said method comprising a focal plane array of a plurality of uncooled micro-bolometers; said method comprising the steps of:
 a. capturing a plurality of images $y_1 \ldots y_n$ of an object of interest by means of said thermal focal plane array with altering capturing conditions;
 b. obtaining a motion matrix $[Mi(\Delta)]$ characterizing difference between said capturing conditions of each captured image;
 c. obtaining point spread function matrixes $[A_1], , , [A_n]$ characterizing a blur condition of each captured images, respectively;
 d. obtaining system gain $[G]$; e. calculating a drift by inverting said system gain $[G]$, motion $[Mi(\Delta)]$ and point spread function matrixes, $[Ai] \ldots [An]$; f calculating a calibrated image by inverting said system gain [G], motion [Mi(A)], point spread function matrixes [Ai] . . . [An] and said images $y_1 \ldots y_n$.

12. A self-calibrating thermal imaging device comprising:
   a. thermal focal plane array further comprising a plurality of uncooled micro-bolometers;
   b. an optical lens configured for creating an image at said thermal focal plane array;
   c. an image processing unit configured for
      i. capturing a plurality of images $y_1 \ldots y_n$ of an object of interest by means of said thermal focal plane array with altering capturing conditions;
      ii. obtaining a motion matrix [Mi(Δ)] characterizing difference between said capturing conditions of each captured image;
      iii. obtaining point spread function matrixes $[A_1]$, , , $[A_n]$ characterizing a blur condition of each captured images, respectively;
      iv. obtaining system gain [G];
      v. calculating a drift by inverting said system gain [G], motion [Mi(A)] and point spread function matrixes, $[A_1] \ldots [A_n]$;
      vi. calculating a calibrated image by inverting said system gain [G], motion [Mi(A)], point spread function matrixes $[A_1] \ldots [A_n]$ and said images $y_1 \ldots y_n$.

13. A method of restoring radiometric images from thermal images captured at unstable conditions; said method comprising the steps of:
   a. capturing a plurality of N groups of thermal images; each group comprising at least two images; images within said groups are characterized by altered capturing conditions relative to each other;
   b. assuming for each pair i of the images that $x_i$=sharpest $\{(y_{i0}, y_{iL})\}$
   c. assigning that the radiometric image $\{x\}=\{x\}^0$ and $\{y\}$; obtaining an updated value of gain $G^1$ and an updated value of drift $d^1$ by means of regression analysis;
   d. Assigning $G=G^1$, $d=dl$ obtained at step c and $\{y\}$; fixing G; obtaining updated $\{x\}^1$ and d by means of minimizing S(G, d, x);
   e. Returning to step c with $\{x\}=\{x\}^1$ and $\{y\}$, obtaining an updated value of gain $G^2$ and an updated value of drift $d^2$ by means of regression analysis;
   f Obtaining a plurality of N restored radiometric images by cycling steps c to d up to achieving convergence of cost function S(G, d, x) minimization.

14. The method according to claim 11 comprising at least one of the following steps:
   a. a step of altering capturing conditions of said first and second images further comprising an action selected from the group consisting of defocusing said thermal imaging device, spatially moving said thermal imaging device, introducing an aberration element into said thermal imaging device and any combination thereof; and
   b. a step of altering capturing conditions comprises altering systems transparency.

15. The method according to claim 11, wherein steps of capturing said first and second images $y_1$ and $y_2$ at a spectral range selected from the group consisting of an ultraviolet spectral range, a visual spectral range, a near infrared spectral range, a middle infrared spectral range, a far spectral range and any combination thereof.

16. The method according to claim 12, comprising a step of altering capturing conditions comprises altering systems transparency.

17. The method according to claim 11, wherein said step of minimizing S(G, d, x) is implemented by means of Sparse Equations and Least Squares algorithm, with a small number of steps.

18. An imaging device comprising:
   a. thermal focal plane array further comprising a plurality of light sensors;
   b. an optical lens configured for creating an image at said thermal focal plane array;
   c. an active optical lens configured to alter amplitude and/or phase or within a field of view;
   d. an image processing unit configured for:
      i. capturing a plurality of N groups of thermal images; each group comprising at least two images; images within said groups are characterized by altered capturing conditions relative to each other;
      ii. assuming for each group i of the images that $x_i$=sharpest $\{(y_{i0}, y_{iL})\}$
      iii. assigning that the radiometric image $\{x\}=\{x\}^0$ and $\{y\}$; obtaining an updated value of gain $G^1$ and an updated value of drift $d^1$ by means of regression analysis;
      iv. Assigning $G=G^1$, $d=d^1$ obtained at step (iii) and $\{y\}$; fixing G; obtaining updated $\{x\}^1$ and d by means of minimizing S(G, d, x) with Sparse Equations and Least Squares algorithm, with a small number of steps;
      v. Returning to step (iii) with $\{x\}=\{x\}^1$ and $\{y\}$, obtaining an updated value of gain $G^2$ and an updated value of drift $d^2$ by means of regression analysis;
      vi. Obtaining a plurality of N restored radiometric images by cycling steps iii to iv up to achieving convergence of cost function S(G,d,x) minimization.

19. The device according to claim 18, wherein at least one of the following is true:
   a. said optical lens is of a variable focus distance;
   b. said device is spatially movable relative to an object to be imaged;
   c. said device comprises an optical element configured for introducing an aberration/amplitude variation into said thermal imaging device and any combination thereof.

20. The device according to claim 18, wherein said image processing unit is configured for minimizing S(G,d,x) by means of Sparse Equations and Least Squares algorithm, with a small number of steps.

* * * * *